United States Patent [19]

Lorenz

[11] Patent Number: 4,482,252
[45] Date of Patent: Nov. 13, 1984

[54] CALIBRATION METHOD AND APPARATUS FOR OPTICAL SCANNERS

[75] Inventor: Dieter Lorenz, Hohenpeissenberg, Fed. Rep. of Germany

[73] Assignee: Deutsche Forschungs, und Verschsanstalt für Luft- und Raumfahrt e.V., Cologne, Fed. Rep. of Germany

[21] Appl. No.: 342,084

[22] Filed: Jan. 25, 1982

[30] Foreign Application Priority Data

Jan. 29, 1981 [DE] Fed. Rep. of Germany ....... 3102880

[51] Int. Cl.³ .................. G01N 21/55; G01J 1/16; G01D 18/00
[52] U.S. Cl. .................. 356/448; 250/252.1; 356/243
[58] Field of Search .......... 356/448, 229, 230, 72, 356/73, 243; 250/334, 251.1, 338, 347, 252.1; 350/6.5, 6.9; 358/206, 113

[56] References Cited

U.S. PATENT DOCUMENTS 3,752,915 8/1973 Parker et al. .................. 358/113 X
4,349,843 9/1982 Laakmann et al. ............. 250/334 X
4,390,785 6/1983 Faulhaber et al. ............. 250/334 X

*Primary Examiner*—Vincent P. McGraw
*Attorney, Agent, or Firm*—Frishauf, Holtz, Goodman & Woodward

[57] ABSTRACT

In order to avoid the encumbrance of a rotary mirror scanner by large calibrating radiation sources for intermittently illuminating the detector element of the scanner, a supplementary radiometer responsive to the same scene as is scanned is absolutely calibrated by intermittent illumination from calibrating sources that are conveniently small. The calibrated radiometer signal is compared to portions of the scanner output responding to the same object field, for calibration of the scanner output. The radiometer may be scanned at right angles to the direction of scan of the scanner in order to provide calibration of both the forward cross lines and rear cross lines alternately scanned by a stereoscopic scanner, for stereoscopic observation of cloud formations, land masses, air traffic distribution or the like from a space craft.

9 Claims, 12 Drawing Figures

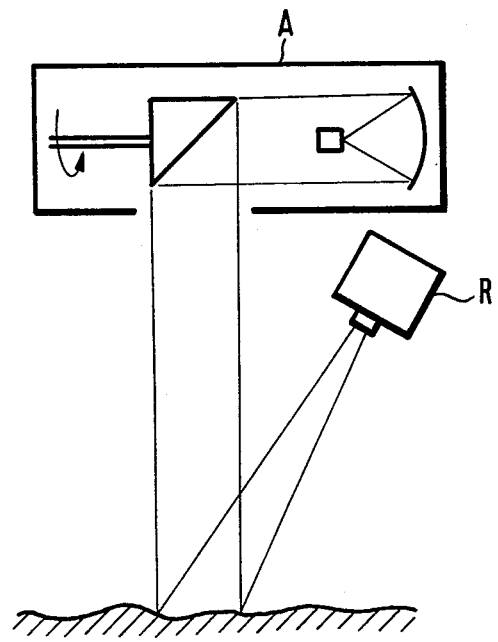
FIG. 3
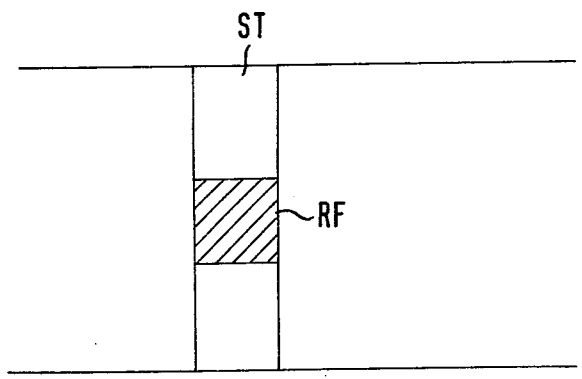

CALIBRATION METHOD AND APPARATUS FOR OPTICAL SCANNERS

This invention concerns in-service calibration of scanners, particularly strip scanners by which objects, cloudscapes or landscapes are scanned from above the earth in an aircraft or spacecraft. Scanning in the sense in which it is used herein means scanning to pick up from a continually varying direction signals from which an image or pattern corresponding to an object, cloudscape or landscape from which signals are picked up and recording the signals for detection of the image or pattern, for example photographically or photoelectrically, a supplementary recording step being necessary, as is known, in the case of photoelectric detection.

The scanning of objects such as features of the earth's surface, cloudscapes or landscapes, either in the visible spectral region, in the near infrared or in the thermal infrared (all of which are commonly referred to as "optical" to distinguish them from radar echo scanning and the like) from aircraft or spacecraft, for obtaining measurements and for generating pictorial representations, is frequently done with scanners by which elements of the object, cloudscape or landscape are sequentially sensed.

Line scanners, for example, sense an object, cloudscape or landscape in a succession of straight strips running perpendicular to the direction of flight of the aircraft or spacecraft. A broad strip of the cloudscape or landscape running in the direction of flight can then be sensed and recorded without gaps as a result of the movement of the aircraft or spacecraft with the suitable adjustment of flight velocity, flight altitude and opening angle of the optical system. The transverse strips are referred to as lines to distinguish them from the broad strips that they make up by successive scans. The sensing and recording of cloudscapes, landscapes and the like by scattered and/or reflected and/or emitted light can be carried out by means of photodetectors, particularly photoelectric detectors. The measurement precision requirements of the radiation measuring devices, particularly of line scanners, are so high that even small changes must be taken account of, for example changes in the sensitivity of the complete system that may be caused by changes in the sensitivity of the detectors or by temperature changes of the optical system. In the case of optomechanical line scanners, for this reason, it is already known to provide one or more standard radiation sources that are built in so that their radiation can be measured from time to time during the revolution of the scanner mirror for calibration purposes (Applied Optics 19, 2153–2161 (1980)).

FIGS. 1A and 1B schematically illustrate how such a calibration procedure during operation of the device can be carried out. As shown in FIG. 1A, the rotary mirror DS turns about the axis A and scans a line-strip of the object surface G running perpendicular to the plane of the drawing while the mirror, during its revolution, can receive light from below. The radiation scattered and/or emitted from below is deflected by the rotary mirror DS onto the optical element (focusing mirror) OP of the scanner by which the light is focused onto the detector DE, which then produces a corresponding measurement signal, for example in the form of an electrical voltage U. It is assumed that the relation between the values of the voltage U and the radiation intensity S has been preliminarily determined by calibration in a laboratory (see the laboratory calibration curve 11 given in FIG. 2).

FIG. 1B shows the apparatus of FIG. 1A with the rotary mirror DS in a part of its revolution in which it receives radiation from the calibration radiation source ES and reflects this radiation S (ES) to the detector DE. If the absolute value of the radiation from the standard source is known, (in the case of a calibration source for the infrared spectral region, for example, from the temperature of the radiation source) a point of the operational calibration curve is thereby known, which can deviate somewhat from the curve obtained in the laboratory, possibly because the sensitivity of the detector is different under the measurement conditions and during the laboratory calibration.

If several calibration radiation sources ES are provided, which supply different known values S (ES) of radiation, correspondingly more points differently disposed on the operational calibration curve applicable to the contemporaneous operation can be determined. This operational calibration curve is then used for the evaluation of the measurements of the scan object G, or else corresponding corrections are applied to an evaluation by reference to the laboratory calibration curve. Different operational calibration curves can thus apply to different time stages of operation and thus also provide different corrections to the laboratory curve.

High requirements of optical resolution for scanners further require greater diameters of the optical systems and therby also larger calibration sources of radiation, since otherwise the calibration and measurement radiation beams would not be comparable. Probably for this reason no system for in-flight calibration was built in to the optical system of the radiometric weather satellites Meteosat 1 and Meteosat 2. These size requirements are responsible for the fact that in the case of a known stereo line scanner, in which the largest part of the 360° scanning mirror revolution is required for picking up measurement signals, the difficulty arose to keep free a sufficient portion of the revolution cycle of the scanner for the use of the calibration radiation sources (see DE-OS No. 28 33 808).

THE INVENTION

It is an object of the invention to provide a method and apparatus for improving the calibration procedures for scanners of cloudscapes, landscapes and the like to overcome to a great extent the above-described disadvantages in such a way that a calibration of the entire scanner, including its optical system, may be possible. Briefly, such an improvement is obtained by disposing a calibration radiometer for exposure to radiation from the same object, cloudscape or landscape from which the scanner to be calibrated picks up radiation.

By comparing the response of a calibrating radiometer with the response of the scanner, calibration can be obtained during flight without any necessity of building into the scanner apparatus any calibration radiation sources, assuming that the radiometer is absolutely calibrated.

FIGS. 3A and 3B illustrate this concept, respectively in side view of the system and in plan view of the ground area. The radiometer R can, as illustrated, be so directed as to pick up radiation from the shaded section RF shown in FIG. 3B which is part of the strip ST contemporaneously scanned by the scanner A. The radiation value S (RF) is obtained from the measurement by the absolutely calibrated radiometer R for the object section RF. The scanner A provides the voltage value U (RF) for the section RF of its scan. As shown in FIG. 4 this pair of values determines one point of the operation-calibration curve of the scanner, so that the displacement of the operational calibration curve 22 from the laboratory calibration curve 21 can be obtained. Since a new pair of values S (RF), U (RF) is produced for each new line of the scanner, and these as a rule vary from each other, these comparisons can be utilized to provide a complete set of different locations of the calibration curve.

The measurement field RF of the calibration radiometer does not necessarily need to correspond exactly with any part of the field of a scan of the scanner. If it is greater than what the scanner sees at any moment, the determination of U (RF) should be averaged over the corresponding number of measurements of the scanner included in the field RF.

The calibration procedure according to the invention does not as a rule dispense with the necessity of absolute calibration of the calibrating radiomenter during operation, for example with built-in standard radiation sources, but calibration of the radiometer with standard sources is much easier to carry out for the calibration radiometer than for the scanner itself. In many cases adequate calibration in flight is practicable only for a calibrating radiometer.

A particular advantage of the invention results from the fact that by means of the additional absolutely calibrated radiometer it is possible to achieve independence of the technical limitations of the scanner, which is particularly significant in the case of line scanners. Thus, an absolute calibration of the scanner can be carried out during operation that takes account also of influences affecting the optical system of the scanner even when a large optical system is involved.

The supplementary radiometer can be small in comparison to the scanner, particularly if the optical resolution of the radiometer is smaller than that of the system to be calibrated. The radiometer can be internally calibrated absolutely during operation, for which purpose relatively small calibrating radiation sources can be used. There is the further advantage that the supplementary radiometer can be oriented in a fixed direction, if desired. By equipping one or more radiometers used for calibration with additional spectral channels which are not within the operating region of the line scanner, it is possible to accomplish additional tasks that may be necessary for processing the measurement data, but which require either no surface scanning or only a limited surface scanning that involves only slight resolution requirements. This is the case, for example, for measurements of parameters of the radiation balance.

THE DRAWINGS

The invention is further described by way of illustrative example with reference to the annexed drawings, in which:

FIG. 3A is a schematic representation in side view of a scanner and an associated radiometer for illustration of the method of the invention;

FIG. 3B is a plan view of the observed fields of the scanner and of the radiometer of FIG. 3A;

DESCRIPTION OF THE ILLUSTRATED EMBODIMENTS

Figure 5:
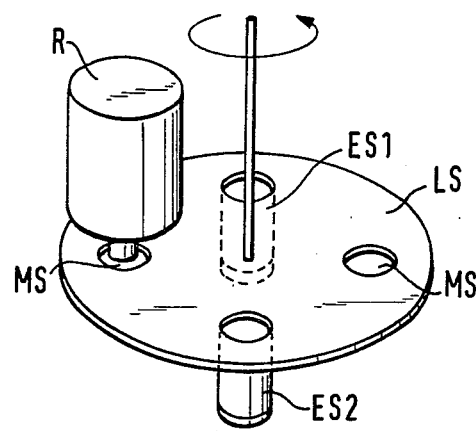
FIGS. 5 and 7 are perspective views respectively of 2 embodiments for carrying out the method of the invention, showing the disposition of the supplementary radiometer and calibrating sources therefore.

FIG. 5 illustrates a supplementary radiometer R provided for calibrating a line scanner and so disposed with respect to the line scanner that the position of its field of view compared to that of the line scanner is known, as for example, in the case of the system diagramatically shown in FIG. 3A.

In this case, an aperture wheel LS is rotatably disposed in front of the radiometer R, so that the radiometer will alternately be able to measure radiation from its field of view through one of the openings MS and the radiation of one of the calibrating radiation sources ES1 and ES2. The radiometer is thus self-calibrated internally by the standard radiation sources and can therefore be said to be absolutely calibrated. The radiation measured from the field of the radiometer is compared with that measured by the line scanner from the same section of the object field. Continuous rotation of the aperture disk has the particular advantage in the upper atmosphere and outer space that it produces no supplementary acceleration.

Figure 6:
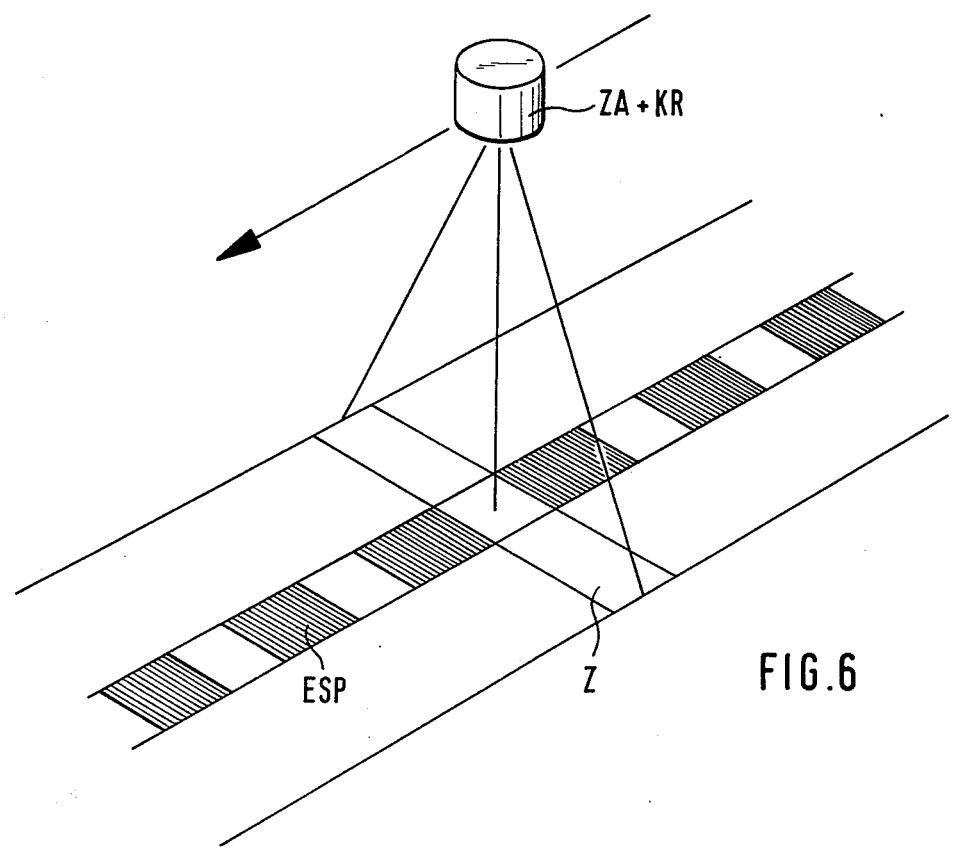
FIGS. 6, 8 and 9 are diagramatic views, in perspective, showing the respective fields of scanner and supplementary radiometer in different manners of using apparatus according to the invention.

FIG. 6 shows the scan path strip of the line scanner ZA with one scan line Z drawn in and the calibration track ESP of the calibrating radiometer KR also shown. The calibrating track is interrupted, because during the intervals represented by the shaded portions of the calibration track the radiometer measures the standard radiation for internal calibration.

Figure 8:
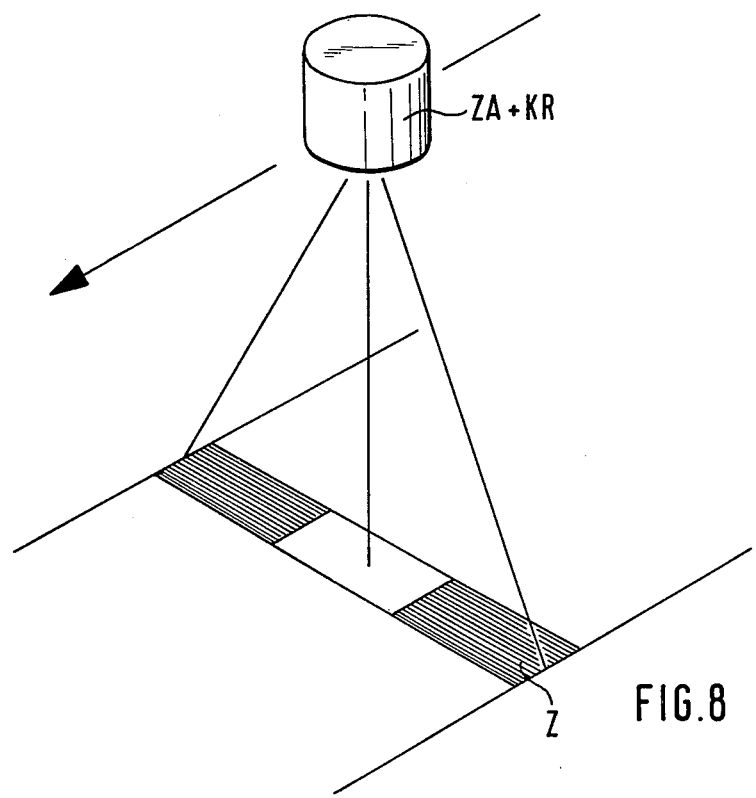
Figure 9:
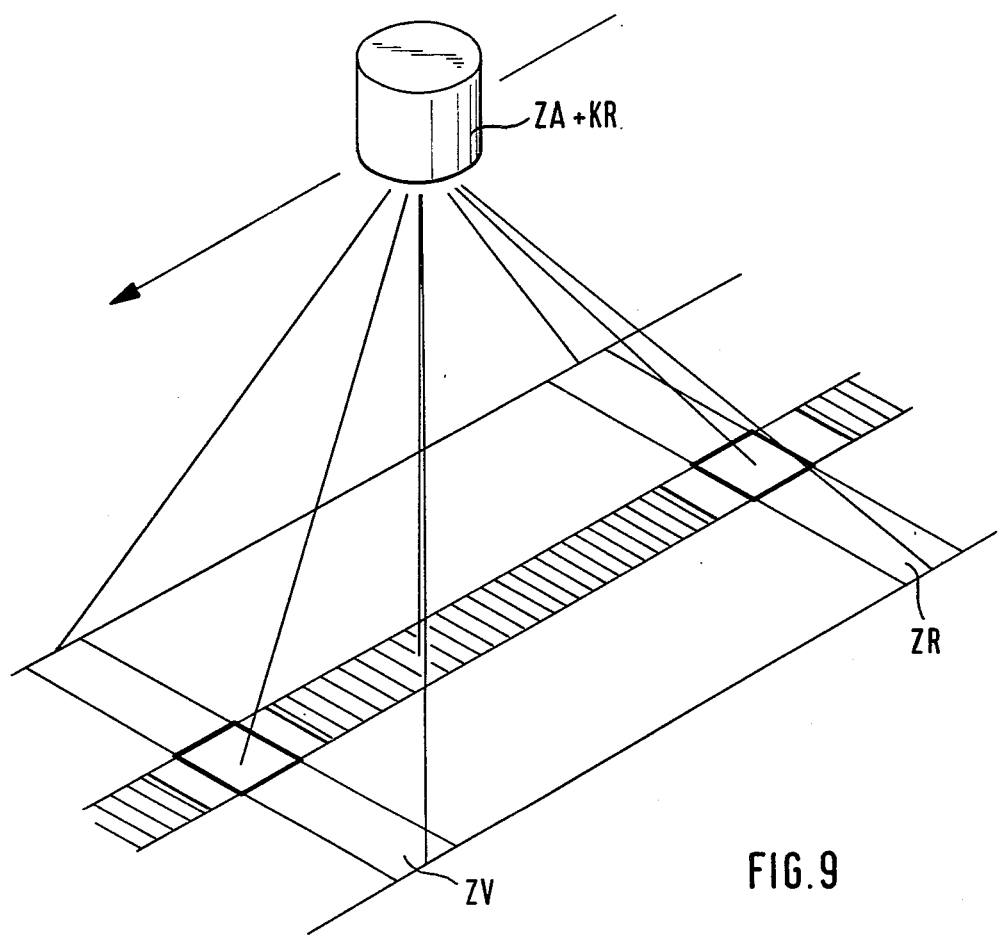

In FIG. 6, FIG. 8 and FIG. 9 the entire combination of scanner and radiometer is represented by a cylindrical body designated "ZA+KR," for simplification of the illustration, and the direction of flight of the aircraft of spacecraft on which the equipment is carried is indicated by a large arrow.

Figure 7:
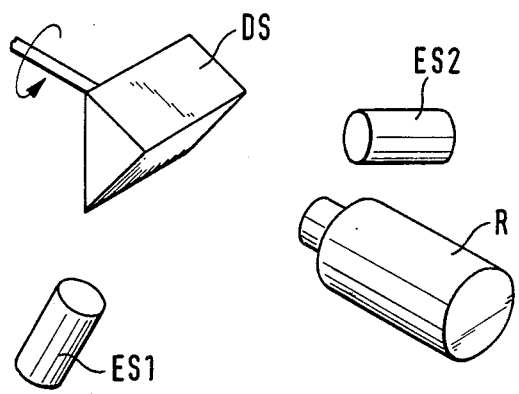

The embodiment illustrated in FIG. 7 differs from the one shown in FIG. 5 by the provision of an additional rotary mirror DS, which turns in front of the radiometer R. Here again the radiation to be measured and the calibration radiation from the calibration radiators ES1 and ES2 are alternately supplied to the radiometer. In the case here illustrated the rotary mirror is a prismatic mirror with two 45° surfaces. In one revolution of the mirror the radiation to be measured and the two calibration radiations are each supplied twice to the radiometer. According to the requirements of the particular case a single-reflecting, triple reflecting and/or multiple-reflecting rotary mirror could likewise be used. With this embodiment, as distinguised from the embodiment of FIG. 5, scanning in strip form can also be performed for the radiometer, with the number of reflector surfaces of the rotary mirror determining the extent of the scanned region. In principle, scanning can also be provided for the apparatus of FIG. 5 if this apparatus is swung from side to side perpendicularly to the direction of flight. On account of the accelerations produced thereby, however, the latter system does not lend itself well to operations in outer space.

FIG. 8 illustrates the object region strip sensed by the line scanner ZA, with the scan line Z currently being swept also shown, and the portion of the scan region of the radiometer that falls in that scan line corresponding to the unshaded portion of the line. If the rotary mirror of the radiometer is so designed that the entire scanner line width is encompassed in the radiometer field, it is possible in this way to calibrate, according to the invention, a known optoelectronic camera described in Bildmessung and Luftbildwesen 47, 33–40 (1979).

FIG. 9 illustrates calibration for the case of a known kind of stereo line scanner described in DE-OS No. 28 33 808. The axis of the rotary mirror DS illustrated in FIG. 7 is disposed horizontally in the case of FIG. 9 and perpendicular to the direction of flight, so that the scanning of the supplementary radiometer is in the direction of flight. In this manner it is possible to carry out calibrations for both the forwardly directed and rearwardly directed lines of the scan planes ZV and ZR. The shaded portions of the calibration track signify that at the corresponding positions of the rotary mirror of the radiometer, it is possible to perform internal calibrations with the built-in sources of calibration radiation.

Figure 1:
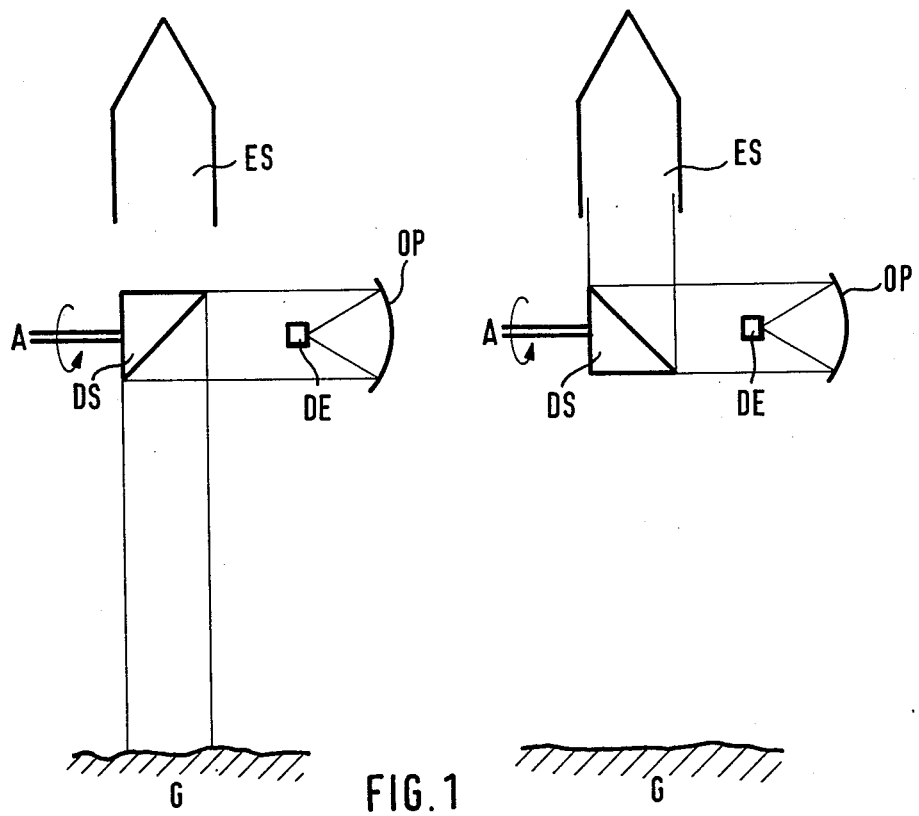
FIG. 1A is a schematic representation of a prior art line scanner with built in calibration radiation sources, in an attitude for scan detection.
FIG. 1B is a representation of the device of FIG. 1A in an attitude for calibration.
Figure 2:
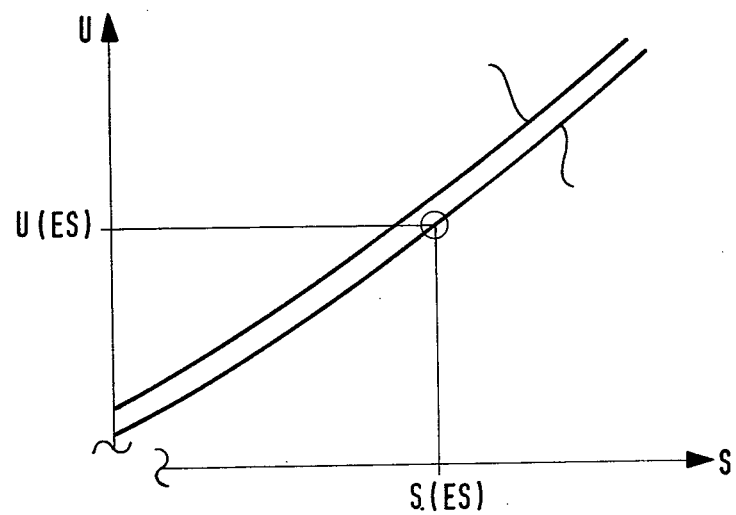
FIG. 2 is a graphical representation of determination of the operational calibration curve by the apparatus of FIGS. 1A and 1B.
Figure 4:
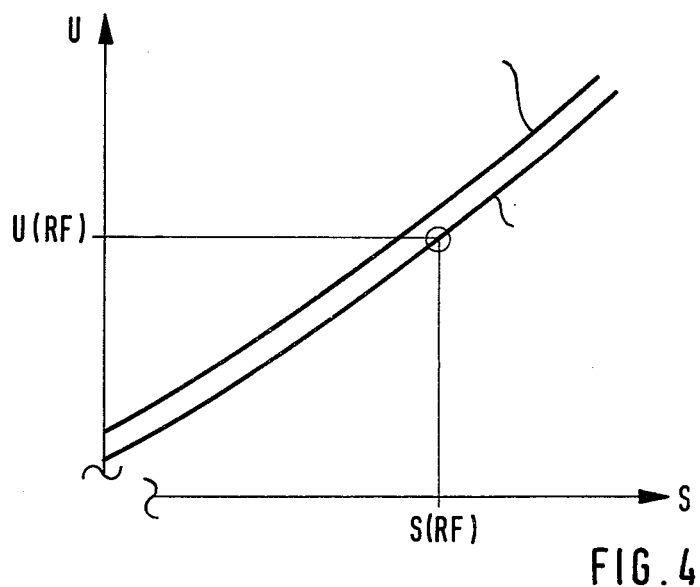
FIG. 4 is a graphical representation of the determination of the operational calibration curve in accordance with the invention.
Figure 10:
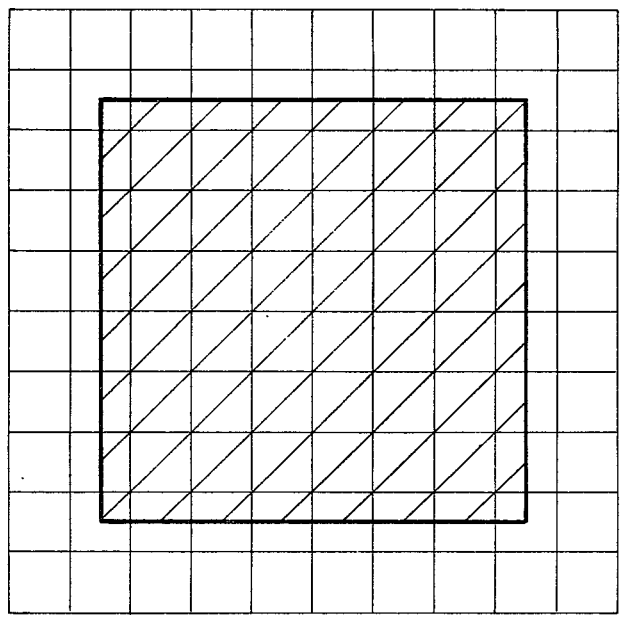
FIG. 10 is a plan view of the field of a line scanner and of a low resolution radiometer bridging several lines of scan.

FIG. 10 shows a section of a surface sensed by a line scanner with individually measured surface elements illustrated as small squares. The diagonally shaded area represents the measuring surface of a supplementary radiometer having a substantially smaller resolution. With apparatus designed for scanner and radiometer fields dimensioned as in FIG. 10, it is possible to use a smaller optical system for the radiometer in comparison to the line scanner with which it is associated, which may desirably have a very high resolution. This makes it possible also to reduce the size of the calibrating radiation sources and accordingly the expense for providing them. In the case illustrated in FIG. 10, the calibration of the line scanner by use of the supplementary radiometer is carried out by means of the average of all measured values of the surface elements lying in the shaded field, perhaps with corresponding weighting of the surface elements only partly sensed in the edge regions of the radiometer field. Accurate knowledge of the surface sensed by the supplementary radiometer is of course necessary.

Different spectral channels of the line scanner, when the line scanner is designed so as to provide them, can be calibrated either with several spectral channels in a single supplementary radiometer or with several supplementary radiometers, each one having one or more spectral channels but not all of them.

In practice both the detector DE of the line scanner (which is in a certain sense a radiometer, although it is referred to as a detector to distinguish it from the calibrating device) and the calibrating radiometer R usually provide electrical voltage outputs. They must, of course be compared in order to provide calibrated scanner measurements. In some cases these outputs can simply be recorded, along with one or more tracks on which are indicated the revolutions of the rotary mirror or mirrors and the progressive travel of the aircraft or spacecraft (or its rate and direction of travel and the time represented by clock pulses). These records can be made on parallel tracks of a magnetic tape for later correlation and evaluation and/or be telemetered through radio channels for evaluation at a ground station. It may, however, be desired to reduce the data to a calibrated scanner output on board the carrier craft, in order to save weight and expense in the recording medium used in a long flight. In this case, instead of merely correlatively recording the outputs of the scanner and of the radiometer, the function performed by the apparatus on the aircraft or spacecraft will include comparison of these outputs to produce a calibrated scanner output.

Figure 11:
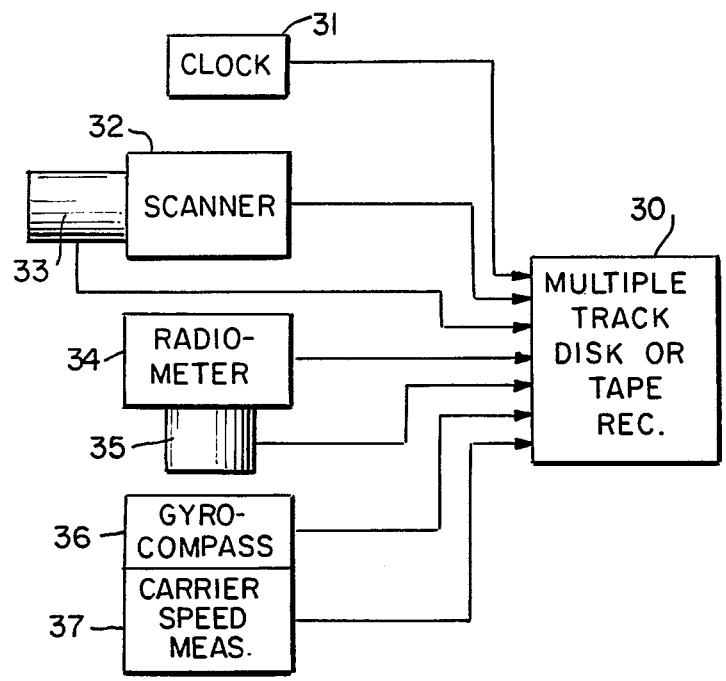
FIGS. 11 and 12 are block diagrams showing ways of interconnecting the outputs of a scanner and a calibrating radiometer for obtaining calibrated observational results.

Thus FIG. 11 shows a multiple track disk or tape recorder 30 to which are fed, in separate tracks, signals from a clock pulse generator 31, the detector output of a scanner 32, position indicating data signals from the scanner motor 33 that operates the revolving mirror of the scanner 32, the signal output of a radiometer 34, position information from a radiometer scanner motor 35, in the case the equipment has a scanning radiometer, as for example, for stereo scanning, directional information regarding the flight of the carrier from a gyro compass 36 and a carrier speed signal from the device generally shown at 37.

Figure 12:
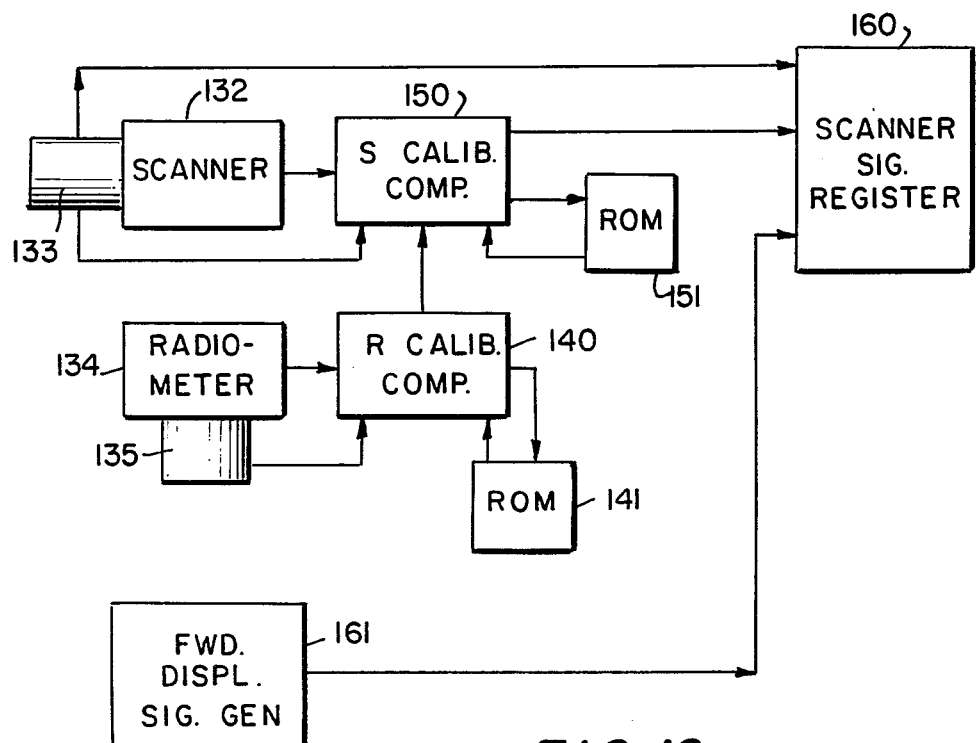

In FIG. 12, the output of the radiometer 134 and the position signals from the radiometer scanning motor 135 are first provided to a radiometer calibration comparator circuit 140, in which by reference to the position signals from the motor 135 the radiometer output is first separated into calibration signals and object measurement signals and then the latter are compared with the most appropriate calibration signals (usually those nearest in time, or last preceding, but if several calibrating sources of different intensity are used, for example, the calibration signal nearest to the intensity level in question might be used).

The read-only memory 141 contains the information from a laboratory calibration curve and is addressable by an address corresponding to the instantaneous value of the object measurement signal from the radiometer 134 to pick the portion of the laboratory curve to which the appropriate calibration correction that has just been computed should be applied to supply a calibrated radiometer output signal to the scanner calibration comparator 150. The scanner 132 provides an output to the scanner calibration comparator 150 and the scanner motor 133 provides position information, by which a signal from the scanner from observation of the same field as is observed by the radiometer can be selected for comparison with the calibrated radiometer signal output of the radiometer calibration comparator 140. This comparison provides a correction to a laboratory calibration curve stored in the read-only memory 151 and this correction is stored in the comparator circuit 150 until the next portion of the scanner signal for comparison with the calibrated radiometer signal comes along. The read-only memory 151 is interrogated continuously by the output signal of the scanner 132 and the corresponding output of the ROM 151 is then corrected with the stored correction just mentioned, to provide a calibrated scanner output signal to the scanner signal register 160. The scanner signal register 160 also receives position information from the scanner motor 133 and from a forward displacement signal generator which produces a signal representative of progress of the carrier craft along its direction of flight (assuming the latter to be horizontal). Thus, the scanner signal register may generate an image tape record, in which the intensity recorded is provided by the scanner calibration comparator, the lateral position on the tape by the scanner motor 133 and the speed of movement of the tape by the forward displacement generator 161. On the other hand, the scanner signal register may simply be a three track linear recorder from which a picture-like representation of the scanned scene will be produced elsewhere, for example for projection on a screen. Of course the signals provided to the scanner signal register, instead of being recorded on board, may be directly transmitted to a ground station for recording and/or picture producing.

Although the invention has been illustrated with respect to particular illustrative embodiments, it will be understood that modifications and variations are possible within the inventive concept.

I claim:

1. Method of calibrating an optical scanner by comparison radiometry during operation thereof in space above the earth comprising the steps of:
disposing at least one radiometer for exposure to a signal from the same object, cloudscape or landscape from which a scanner to be calibrated picks up signals,
intermittently calibrating said at least one radiometer by exposing it to radiation from a standard radiation source while alternately exposing said at least one radiometer to said source and to at least a part of said object, cloudscape or landscape, and
comparing the response of said scanner and the calibrated response of said at least one radiometer respectively relating to the same part of said object, cloudscape or landscape.

2. Apparatus for concurrently calibrated optical scanning of objects, cloudscapes or landscapes from above the earth's surface comprising photosensing means and optical scanning means for presenting cyclically to said photosensing means at least one strip-view of an object, cloudscape or landscape and further comprising:
at least one calibration radiometer disposed for exposure to radiation from at least a part of the portion of said object, cloudscape or landscape substantially contemporaneously presented to said photosensing means by said optical scanning means, said at least one calibration radiometer being equipped with at least one built-in calibrating radiation source and with means for intermittently exposing said radiometer thereto for substantially absolute calibration of response of said radiometer to radiation from said object, cloudscape or landscape, and
means for correlatively recording or otherwise comparing the substantially contemporaneous respective responses of said photosensing means and said radiomenter to radiation from said object, cloudscape or landscape.

3. Apparatus as defined in claim 2 in which said at least one radiometer is fixedly directed to a section of said object, cloudscape or landscape defined by the orientation of said at least one radiometer.

4. Apparatus as defined in claim 2 in which said at least one radiometer is movably directed for response to a section of said object, cloudscape or landscape defined by the orientation of said at least one radiometer.

5. Apparatus as defined in claim 2 in which additional scanning means are provided for defining section of said object, cloudscape or landscape to which said at least one radiometer is exposed.

6. Apparatus as defined in claim 5, in which said additional scanning means include a rotary mirror through which radiation from said at least one built-in calibrating radiation source is supplied to said at least one radiometer.

7. Apparatus as defined in claim 2, in which the optical resolution of said at least one calibration radiometer is substantially less than that of said optical scanning means.

8. Apparatus as defined in claim 2 in which said at least one calibration radiometer and said photosensing means are capable of operation in the same spectrum channels.

9. Apparatus as defined in claim 8, in which said at least one calibration radiometer, in addition to being capable of operating in the same spectrum channels as said photosensing means is also capable of operating in at least one additional spectrum channel.

* * * * *